(12) United States Patent
Su

(10) Patent No.: US 6,460,419 B2
(45) Date of Patent: Oct. 8, 2002

(54) ULTRASONIC FLOW MEASURING METHOD

(75) Inventor: Tyan Khak Su, Ottawa (CA)

(73) Assignees: International Hydrosonic Co., Ltd., Seoul (KR); Hydrosonic International Co., Ltd., Ontario (CA)

( * ) Notice: Subject to any disclaimer, the term of this patent is extended or adjusted under 35 U.S.C. 154(b) by 0 days.

(21) Appl. No.: 09/752,450

(22) Filed: Jan. 3, 2001

(65) Prior Publication Data

US 2002/0053243 A1 May 9, 2002

(30) Foreign Application Priority Data

Sep. 15, 2000 (KR) .......................................... 00-54331

(51) Int. Cl.[7] ............................................... G01D 7/02
(52) U.S. Cl. ................................................... 73/861.31
(58) Field of Search .............................. 73/861.31, 632, 73/861.25, 861.18, 861.27; 128/662.06

(56) References Cited

U.S. PATENT DOCUMENTS 4,336,719 A * 6/1982 Lynnworth ............... 73/861.27
5,351,693 A * 10/1994 Taimisto et al. ......... 128/662.06
5,363,853 A * 11/1994 Lieber et al. ............ 128/662.06
5,967,987 A * 10/1999 Sumanaweera et al. ..... 600/454
6,047,602 A * 4/2000 Lynnworth ................... 73/632

* cited by examiner

*Primary Examiner*—Benjamin R. Fuller
*Assistant Examiner*—Jewel Thompson
(74) *Attorney, Agent, or Firm*—Lee & Sterba, P.C.

(57) ABSTRACT

An ultrasonic flow measuring method that includes selecting a section area in a right angle to an ultrasonic transit trajectory line for measuring a flow velocity as a section area necessary for a flow measurement; and multiplying a flow velocity component of a direction corresponding to an ultrasonic transit trajectory, which is directly measured by an ultrasonic wave, by the section area thereby to compute a flow or flowrate, so that a flow measuring error and a measuring error of a section area can be significantly reduced, thereby enhancing the accuracy of the flow measurement. The apparatus having a plurality of paired transducers disposed within the pipe at opposing sides; a mechanism for measuring a flow velocity of the fluid for each of a plurality of chords dividing the section area; and a mechanism for determining the flow of the fluid based on a product of the average flow velocity of the fluid and a flow computing area.

11 Claims, 5 Drawing Sheets

ULTRASONIC FLOW MEASURING METHOD

BACKGROUND OF THE INVENTION

1. Field of the Invention

The invention is related to an ultrasonic flow measuring technology, and particularly, to an ultrasonic flow measuring method for measuring flow velocities on a plurality of fluid flowing sections and then computing a flow or flowrate, if ultrasonic transducers are mounted on a pipe that had been already arranged on a place.

2. Description of the Background

A general ultrasonic flow measuring method is based on the fundamental technical background as follows: an ultrasonic one channel flowmeter is designed to measure a flow velocity $V_D$ on a part of a fluid flow section, for example the inner diameter of a pipe, using an ultrasonic wave and multiply the flow velocity $V_D$ by a flow coefficient K along with a fluid section area S to calculate a flow. An ultrasonic multi-channel flow measuring method includes steps of measuring a flow velocity $V_D$ and flow velocities on chords divided into a plurality of sections, using an ultrasonic wave, to calculating an average flow velocity $V_S$ of a fluid flow section and multiplying $V_S$ by a section area to calculate a flow. Another method is known to measure an average horizontal flow velocity at a plurality of water depths in an open sluice in order to compute a flow.

Typical ultrasonic flow measuring methods and apparatuses there for are disclosed as follows:

- U.S. Pat. No. 5,531,124 granted on Jul. 2, 1996
- U.S. Pat. No. 4,646,575 granted on Jul. 25, 1987
- U.S. Pat. No. 4,860,593 granted on Aug. 29, 1989
- U.S. Pat. No. 5,780,747 granted on Jul. 14, 1998
- U.S. Pat. No. 4,676,321 granted on Jul. 25, 1996
- Russian Pat. No. 2,138,782 granted on Sep. 27, 1999

The ultrasonic flow measuring methods already known have common properties as follows:

1) A flow measuring section is selected to be a section S in a right angle to a direction of a fluid flow. In case of a pipe, a section rectangular to a centerline is selected.
2) Therefore, a flow velocity in a right angle direction to a section to be firstly measured by an ultrasonic wave is calculated. At that time, it is assumed that the direction of the flow velocity is corresponded to a fluid flow direction.
3) An ultrasonic flow velocity measuring method includes a frequency difference method and a phase difference method, but these methods are based on transit time difference method, which has been broadly used.

A typical transit time difference flow velocity measuring expression is as follows:

$$V = \frac{L^2}{2d}t_2 - \frac{t_1}{t_1 t_2} = \frac{L^2}{2d}\frac{\Delta t}{t_1 t_2} \quad (1)$$

Wherein, L is an interval distance between paired transducers 1 and 2, d is a projection distance of L in which $d = L\cos\Phi$, $t_1$ is a transit time in a flow velocity direction from the paired transducer 1 to the paired transducer 2 and $t_2$ is a transit time in a direction contrary to a flow velocity from the paired transducer 2 to the paired transducer 1 (referring to FIG. 1).

A flow computing expression of an ultrasonic one-channel flow computing method is as follows:

$$Q = K \cdot V_D \cdot S \quad (2)$$

Wherein, K is a flow coefficient, $V_D$ is a flow velocity on a diametric line to be measured by the expression (1) and S is a section area of fluid as defined above, for example an inner section area of a pipe.

One of flow calculation expressions for an ultrasonic multi-channel flow measuring method is as follows:

$$Q = V_S \cdot S \quad (3)$$

Wherein, $V_S$ is a total average flow velocity on a plurality of chords to be measured by the expression (1).

An ultrasonic flowmeter has most characteristics as follows: unlike another flowmeter, mounting transducers on a pipe that had been already arranged in a place can perform a flow measurement. Even under the condition that fluid is transported through the pipe, the transducers can be mounted on the pipe through the drilling work thanks to the technology progress. For the characteristics, the ultrasonic flowmeter is very often used.

Particularly, the ultrasonic multi-channel flow measuring method can measure a flow, exactly, even if a condition that K=constant, for example a distance of a straight portion of a pipe becomes at least 25D and $Re > 10^4$, is not secured and a flow velocity distribution is not a normal state, or if the inner diameter of the pipe is relatively larger. Therefore, the characteristics enable the ultrasonic flowmeter to be used as a flowmeter for a larger pipe.

FIG. 2 shows five chords for measuring a flow velocity, but the number of chord can be increased as requested. As shown in FIG. 2, in order that $d = L_i \cdot \cos\Phi_i = \text{const}$, mounting angles $\Phi_i$ of paired transducers $\mathbf{1}_i$ and $\mathbf{2}_i$ are not equal to each another.

As represented in the expressions (2) and (3), a flow measuring error $\delta_Q$ is considered as a sum of a flow velocity measuring error $\delta_V$ and a section area measuring error $\delta_S$. The flow measuring error $\delta_Q$ in the ultrasonic one-channel flow measuring method is as follows:

$$\delta_Q = \delta_K + \delta_{VD} + \delta_S \quad (4)$$

The flow measuring error $\delta_Q$ in the ultrasonic multi-channel flow measuring method is as follows:

$$\delta_Q = \delta_{Vi} + \delta_M + \delta_S \quad (5)$$

Wherein, $\delta_K$ is a flow coefficient error, $\delta_M$ is an error followed by calculating an average flow velocity of a section using a flow velocity $V_i$ measured on a plurality of chords, for example an approximate integral error of an expression that $$V_S = \frac{1}{2R}\int_{-R}^{+R} V(r)\,dr$$

In the expressions (4) and (5), the flow measuring error $\delta_Q$ is determined by the flow velocity measuring error $\delta_V$ and the section area measuring error $\delta_S$. Therefore, in order to enhance the accuracy of the flow measuring, the flow velocity measuring error $\delta_V$ and the section area measuring error $\delta_S$ are significantly reduced. In the flow velocity measuring expression (1), assuming that the transit time measuring errors includes an accidental error component, a flow velocity measuring error is as follows:

$$\delta = (2\delta_L + \delta_d) + \sqrt{\delta^2_{t1} + \delta^2_{t2} + \delta^2_{\Delta t}} = (2\delta_L + \delta_d) + A \quad (6)$$

$$A = \sqrt{\delta^2_{t1} + \delta^2_{t2} + \delta^2_{\Delta t}}$$

Wherein, $\delta_L$ is a measuring error of an interval distance L, and $\delta_d$ is a measuring error of d, in which L and d are a constant to be inputted into an arithmetic logic processor or microprocessor after being measured. Therefore, the symbols of the $\delta_L$ and $\delta_d$ are not changed. In other words, these errors are a fixing error. $\delta_{t1}$, $\delta_{t2}$ and $\delta_{\Delta t}$ are errors of each of transit times $t_1$ and $t_2$, and the error $\Delta t = t_2 - t_2$.

As represented in the expression (6), even through $t_1$ and $t_2$ are precisely measured under the condition that A is reduced enough to be ignored, if $\delta_L$ and $\delta_d$ are relatively larger, the flow velocity measuring error $\delta_V$ becomes larger. Herein, what the measuring error $\delta_L$ of L is multiplied by 2 is because of $L_2$. In case of the pipe, the section area S is calculated by measuring ab inner diameter D as follows:

$$S = \frac{\pi D^2}{4}$$

The calculation error of the section area is as follows:

$$\delta_S = 2\delta_D \quad (7)$$

Wherein, $\delta_D$ is a measuring error of an inner diameter D.

Therefore, the measuring errors of geometrical integers or constants L, d, D appear as a flow measuring error as follows:

$$\delta_Q = (2\delta_L + \delta_d + 2\delta_D) + A \quad (8)$$

These errors are a fixing error represented as an arithmetical sum with their symbols being known.

In case of a flowmeter of a flange type, the inner diameter D is measured several times to obtain its average value $\overline{D}$, so $\delta_S = 2\delta_D$ is secured to become smaller. But, measuring the interval distance $L_i$ between the transducers is not simple. There is a measuring instrument capable of measuring an inner diameter, exactly, but there is not a precise measuring instrument that can directly measure an ultrasonic transit distance $L_i$ between the transducers disposed at an angle $\Phi$ to an axis of a pipe. For it, it is very difficult to secure a small value of $\delta_{Li}$ enough to be ignored. A measuring error $\delta_d$ of the projection distance $d = L\cos\delta$ calculated by measuring the interval distance L and a mounting angle $\Phi$ of the transducer is as follows:

$$\delta_d = \delta_L + \delta\cos\Phi \quad (9)$$

Herein, $$\delta\cos\varphi = \frac{\cos(\varphi \pm \alpha)}{\cos\varphi} = \cos\alpha \mp \tan\delta\sin\alpha - 1$$

Therefore, $\delta_d$ is as follows:

$$\delta_{dMAX} = \delta_L + (\cos\alpha + \tan\Phi\sin\alpha - 1) \quad (10)$$

Wherein, $\alpha$ is a absolute error of an angle $\Phi$ to be measured, for example if $\delta = 45°$ and $\alpha = 0.25°$, $\delta\cos\Phi \approx 0.44\%$. The geometrical distance measuring error $\delta_h$ is as follows:

$$\delta_h = 2\delta_L + \delta_d + 2\delta_D = 3\delta_L + 2\delta_D \quad (11)$$

But, if the transducers are mounted on the pipe that had already been arranged at a place, the inner diameter D of the pipe cannot be measured at firsthand. Furthermore, the inner diameter identified by a pipe manufacturer has a predetermined deviation. If an anti-corrosion layer is coated, its thickness cannot be identified. Due to it, it is common that the absolute error of the inner diameter is approximately 2~4 mm. If $\Delta D = 4$ mm, $\delta_D = 4 \times 100/600 = 0.67\%$, and the section error $\delta_S = 2 \times 0.67 = 1.34\%$.

On the other hand, there discloses a method of exactly measuring a transit distance $L_i$ using an ultrasonic wave. A sound velocity C in fluid of a pipe is measured by a three-point method, and then the transit time $t_{1-2}$ between paired transducers is measured, so $L = C \times t_{1-2}$, which suggests the exact value of L. For example, a method which is disclosed in U.S. Pat. No. 5,531,124 issued on Jul. 2, 1996 comprises steps of measuring the transit time $t_{1-2}$ between paired transducers, inserting one transducer into the pipe by $\Delta L$ and again measuring the transit time $t_A$, thereby measuring a flow velocity on the inner diameter of a pipe.

$$t_{1.2} = \frac{L}{C}; \quad t_\Delta = \frac{L - \Delta L}{C}; \quad t_{1.2} - t_\Delta = \frac{\Delta L}{C} \quad (12)$$

$$\therefore C = \frac{\Delta L}{t_{1.2} - t_\Delta}$$

$$L_i = C(t_{1.2})i \quad (13)$$

If the transit time $t_{1-2}$ and the distance $\Delta L$ are very precisely measured, the error of $L_i$ gets smaller. On the contrary, if the inner diameter is larger, the error of $L_i$ obtained by the expressions (12) and (13) may become larger. The reason is as follows: the sound velocity C obtained by the expression (12) is a sound velocity in an interval of $\Delta L$, but it may be not equal to the sound velocity in the interval $\Delta L$. In other words, if a fluid temperature of the interval $\Delta L$ away in a predetermined distance from a pipe wall is not corresponded to an average temperature of all intervals $L_i$, the sound velocity C obtained by the expression (12) is not the same as a sound velocity $CL_i$ in the interval $L_i$. If $\Delta L = L_i/2$, C is equal to $C_{Li}$. But, if the inner diameter of the pipe is larger, the length of the transducer for measuring the sound velocity is extended, because $L_i$ becomes larger.

A main object of the invention is to provide to an ultrasonic flow measuring method for measuring flow velocities on a plurality of fluid flowing sections and then computing a flow or flowrate, if ultrasonic transducers are mounted on a pipe that had been already arranged on a place.

Another object of the invention is to provide an ultrasonic flow measuring method for significantly reducing an error component of geometrical integers necessary for measuring and calculating a flow velocity and a flowrate.

Another object of the invention is to provide an ultrasonic flow measuring method for enabling the same mounting angle of each of paired transducers to facilitate the transducers to be mounted on a pipe that was already arranged on a place.

SUMMARY OF THE INVENTION

According to the invention, an ultrasonic flow measuring method comprises steps of selecting an inner section area $S\Phi$ of a pipe cut at an angle $\delta$ of 45° as a flow measuring section, in which the inner section area $S\Phi$ is an ellipse or oval form, mounting paired transducers at two points having a longer diameter of the inner section area $S\Phi$, mounting a predetermined number of paired transducers along the periphery of the ellipse on both sides by the center of the longer diameter, measuring flow velocities on a plurality of chords of the ellipse using an ultrasonic wave, computing an average flow velocity of the section area SΦ and multiplying the average flow velocity by the section area SΦ to measuring the flow or flowrate, in which the longer diameter of the section area SΦ is subject to being measured using the ultrasonic wave.

BRIEF DESCRIPTION OF THE DRAWINGS

The invention now will be described in detail in reference to the accompanying drawings, in which:

FIG. 5 is a schematically cross-sectional view illustrating a sound velocity measuring apparatus for exactly measuring a distance between paired transducers according to the invention; and, FIGS. 6A and 6B are schematically views illustrating a method of measuring a flow in a sluice, in which

DETAILED DESCRIPTION OF THE PREFERRED EMBODIMENT

A flow or flowrate Q is to multiply a section area S in a right angle to a direction of a flow velocity by a section average flow velocity $V_S$. If the flow velocity direction of fluid flowing in a pipe is corresponded to the centerline of the pipe, the direction of the flow velocity $V_L$ to be measured in a first step using an ultrasonic wave is as follows:

$$V_L = V\cos\Phi \quad (14)$$

Therefore, a value q multiplying a section $S_{e\perp}$ at a right angle to the flow velocity $V_L$ by the flow velocity $V_L$ is the same as that of multiplying the flow velocity V to the section area S.

$$q = V_L \cdot S_{e\perp} = V \cdot S \quad (15)$$

Figure 1:
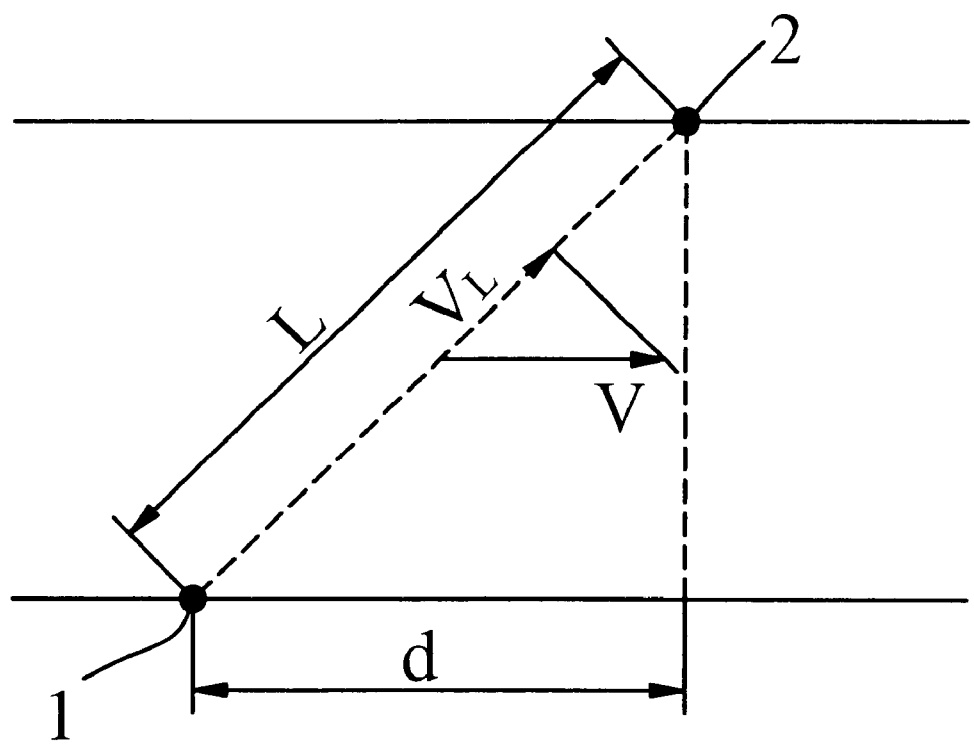
FIG. 1 is a view illustrating an ultrasonic flow velocity measuring method according to a prior art.
Figures 2A, 2B:
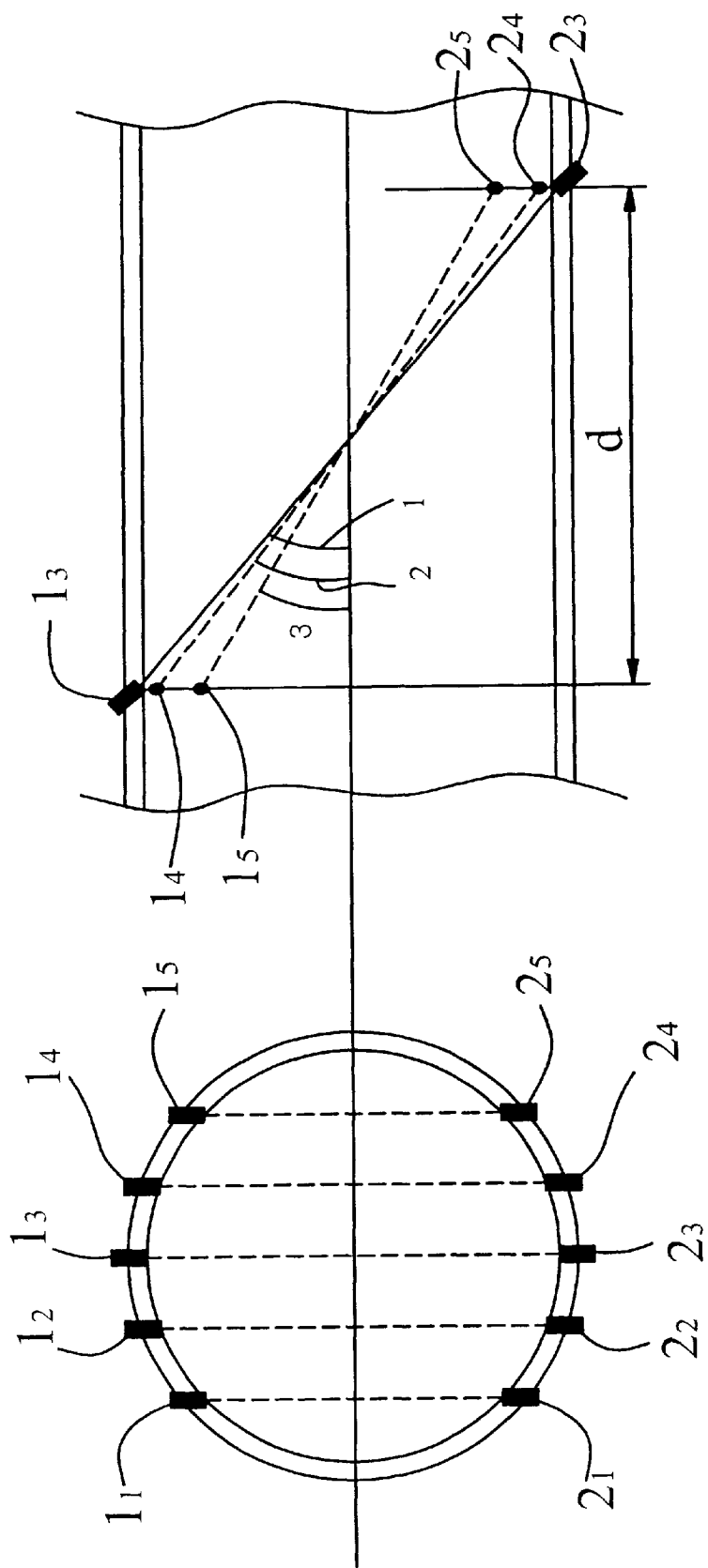
FIGS. 2A and 2B are views illustrating a configuration of ultrasonic multi-channel flow velocity measuring cords of a prior art.
Figure 3:
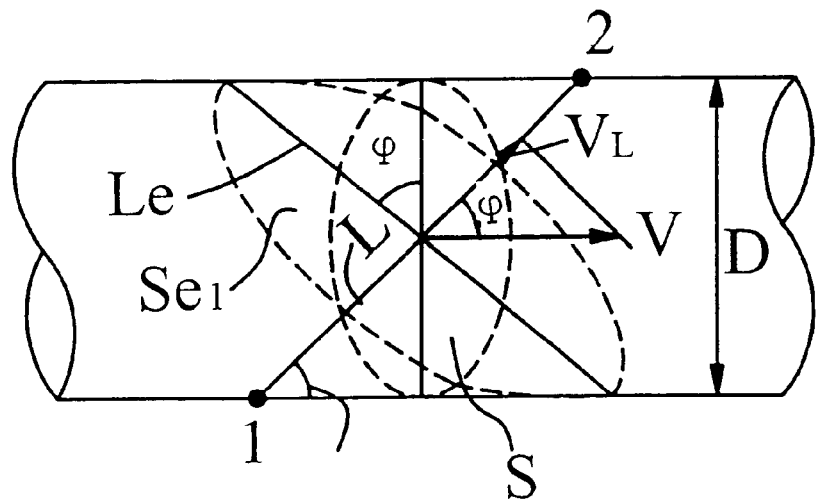
FIG. 3 is a schematically view illustrating a method of selecting a flow measuring section according to the invention.

Such like a relationship is represented in FIG. 3. In FIG. 3, the section area S is as follows:

$$S = \frac{\pi D^2}{4}$$

A section area $S_{e\perp}$ of an ellipse is as follows:

$$S_{e\perp} = \pi/4 L_e D$$

Wherein, $L_e$ is a longer diameter of the ellipse $S_{e\perp}$, and D is a shorter diameter that is equal to the inner diameter of the pipe. The longer diameter $L_e$ is as follows:

$$L_e = \frac{D}{\cos\varphi}$$

Therefore, $S_{e\perp}$ is as follows:

$$S_{e\perp} = \frac{\pi D^2}{4\cos\varphi} = \frac{S}{\cos\varphi} \quad (16)$$

The expression (16) is substituted into the expression (15) and then into the expression (14) instead of $V_L$. Whereby, the following expression is obtained.

$$q = V_L S_{e\perp} = V\cos\varphi \frac{S}{\cos\varphi} = V \cdot S$$

If Φ=45°, assuming that an area of the ellipse is $S_e$ and paired transducers 1 and 2 are mounted on the apex points forming the longer diameter of the ellipse, an interval distance L between the paired transducers is constituted as a longer diameter of the ellipse $S_e$. If Φ≠45°, the ellipse area $S_{e\perp}$ subject to being selected is as follows:

$$S_{e\perp} = S\Phi tan\Phi = \pi/4 \cdot D \cdot L \cdot tan\Phi \quad (17)$$

Wherein, L is an interval distance between paired transducers 1 and 2 disposed at both apex points of a longer diameter of an ellipse, and $L_e$=Ltan Φ which is a longer diameter.

If Φ=45°, for example tan45°=1, $S_{e\perp}$=SΦ, the longer diameter of which is L.

The direction of a flow velocity $V_L$ measured by an ultrasonic transit time difference method corresponds to that of a line L connecting the paired transducers 1 and 2 to each other, and the flow velocity $V_L$ is as follows:

$$V_L = \frac{L}{2} \frac{t_2 - t_1}{t_1 t_2} \quad (18)$$

The expression (18) is derived as follows:

$$t_1 = \frac{L}{C + V\cos\varphi} = \frac{L}{C + V_L}$$

$$t_2 = \frac{L}{C - V\cos\varphi} = \frac{L}{C - V_L}$$

Therefore, from the above expression the relative expressions are established as follows:

$$C + V_L = \frac{L}{t_1} \quad (a)$$

$$C - V_L = \frac{L}{t_2} \quad (b)$$

That is, $$\frac{L}{t_1} - \frac{L}{t_2}$$

is obtained as follows:

$$2V_L = L\frac{t_2 - t_1}{t_1 t_2} \quad \therefore V_L = \frac{L}{2}\frac{t_2 - t_1}{t_1 t_2}$$

Therefore, the expression (18) is established. Herein, it is said that the transit time method is dependant on the sound velocity $C^2$, but it is substantially a wrong thing.

Figure 4:
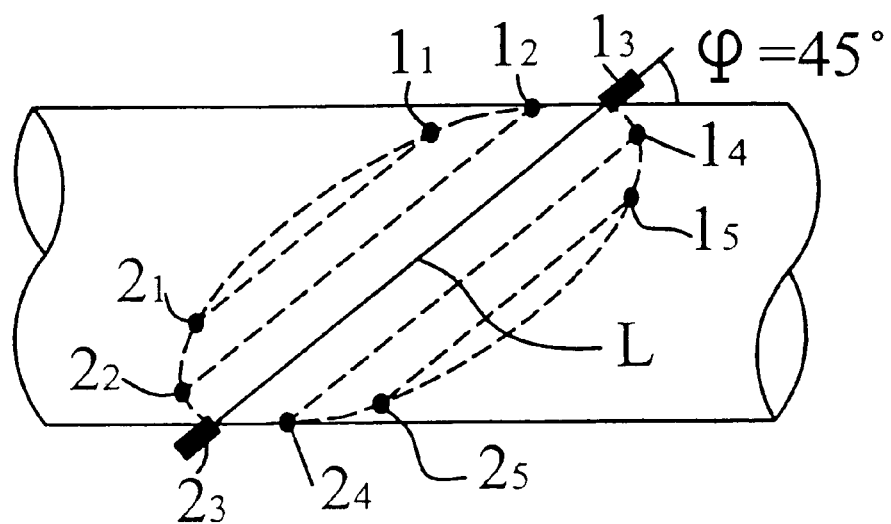
FIG. 4 is a schematically view illustrating a method of measuring a flow by mounting a plurality of a pair of transducers according to the invention.

As shown in FIG. 4, if $\Phi=45°$, a plurality of transducers are mounted along the periphery of an ellipse having a longer diameter of L, a flow velocity $V_{Li}$ is measured on a plurality of chords of a ellipse section area $S_\Phi$ to compute an average flow velocity $V_{S\Phi}$, and then the average flow velocity $V_{S\Phi}$ is multiplied by the ellipse section area $S_\Phi$ to obtain a flow of flowrate Q m²/s of fluid passing through a pipe. And, the mounting angles of paired transducers $1_i$ and $2_i$ are equal to each another. In other words, the same angle $\Phi$ of 45° must be secured. Therefore, it is easy to install the paired transducers on the pipe compared with a prior art, because the paired transducers are mounted at the same angle $\Phi$ of 45° along the cutting angle of the pipe. Like this, it is not necessary to calculate the flow velocity $V_L$ into a flow velocity direction component corresponded to a centerline of the pipe.

In the expression (18), a measuring error $\delta_{VL}$ of the flow velocity $V_L$ is as follows:

$$\delta_{VL} = \delta_L + \sqrt{\delta^2_{t1} + \delta^2_{t2} + \delta^2_{tA}} = \delta_L + A \quad (19)$$

The expression (19) is compared with the measuring error expression (5) of the flow velocity V based on the prior are as follows:

$$\delta_V - \delta_{VL} = (2\delta_L + \delta_d + A) - (\delta_L + A) = \delta_L + \delta_d \quad (20)$$

In other words, the measuring error becomes smaller under the same condition by $\delta_L + \delta_d$. Then, the comparison between measuring errors $\delta_S$ and $\delta_{S\Phi}$ of the section areas are as follows:

$$\delta_S = 2\delta_D$$

$$\delta_{S\Phi} = \delta_L + \delta_D$$

If $\delta_L \ll \delta_D$, the measuring error of the ellipse section area $S_\Phi$ is reduced two times as small as the conventional one. The effect become significant in case that $\delta_D$ is larger because it is not possible to directly measure a pipe inner diameter, when the paired transducers are mounted on the pipe that had been already arranged on a place. For example, if $\delta_D=1\%$, $\delta_S=2\delta_D=2.0$. If $\delta_L$ can be ignored by measuring Le or L, exactly, $\delta_{S\Phi}=\delta_D=1\%$.

Figure 5:
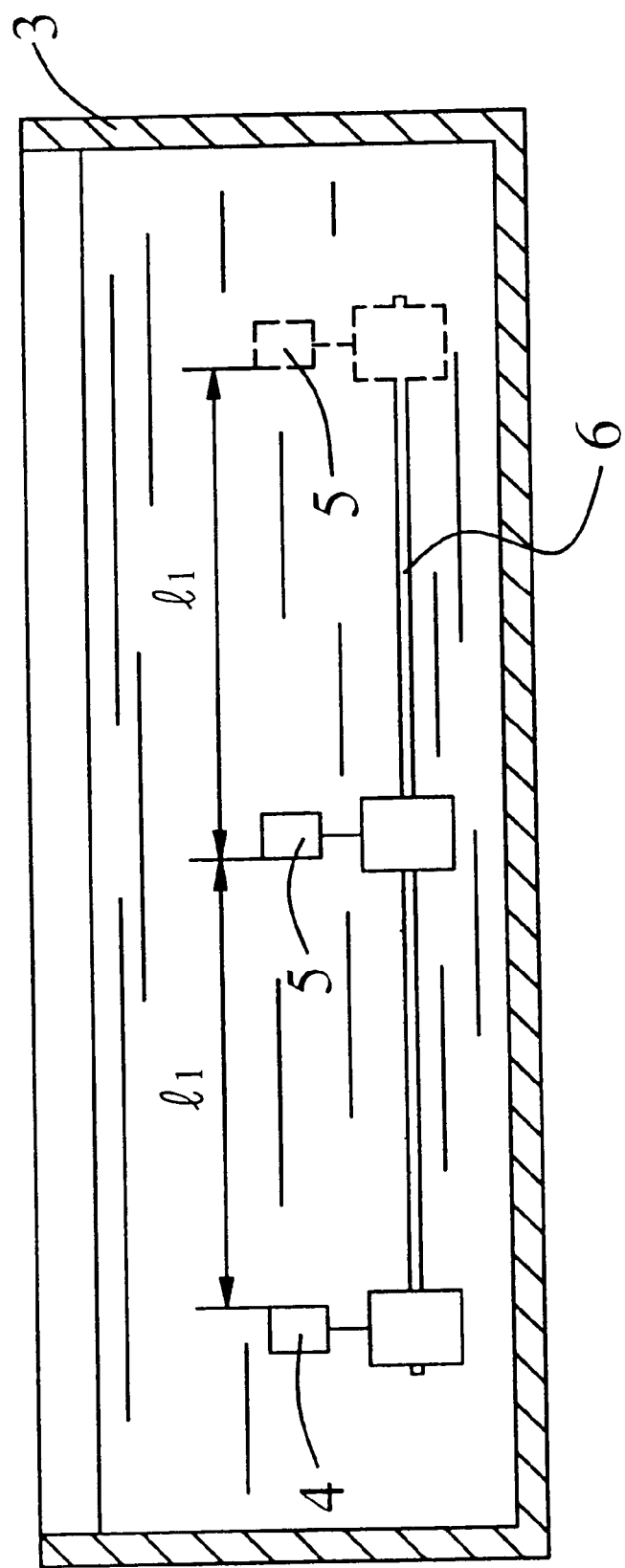

A method of measuring L, exactly, is as follows:

When the paired transducers are mounted on the pipe, a valve is previously mounted. As shown in FIG. 5, a container 3 is fully filled with fluid by opening the valve of the pipe. A sound velocity in fluid of the container is measured. To the end of it, a supporting bar 6 includes transducers 4 and 5, which are mounted to be spaced at a predetermined interval from each other thereon. The supporting bar 6 is disposed at a predetermined depth in the container 3. First, the transducers 4 and 5 are placed to have an interval distance $l_1$ there between to measure an ultrasonic transit time $t^{tL1}$. Then, the transducer 5 is moved by an additional distance $l_1$, so that $l_2=2l_1$. At that time, a transit time $t^{t11}$ is measured. Therefore, the following expression is established.

$$t_{l1} = \frac{l_1}{C} + \tau + \overline{\Delta}t$$

$$t_{l2} = \frac{2l_2}{C} + \tau + \overline{\Delta}t$$

Wherein, $\tau$ is a delay time of an electrical signal in a transit time measuring circuit, and $\Delta t$ is a fixing absolute error of the transit time measuring circuit.

The sound velocity C is obtained using $t_{l1}$ and $t_{l2}$ as follows:

$$C = \frac{l_1}{t_{l2} - t_{l1}} \quad (21)$$

If accidental errors of $t_{l1}$, and $t_{l2}$ are $\Delta_t$, an error $\Delta tl=tl2-tl1$ is as follows:

$$\delta_{\Delta tl} = \frac{\sqrt{2\tilde{\Delta}_t^2}}{t_{l2} - t_{l1}} = \frac{1.4 \times \tilde{\Delta}_t \times C}{l_1} \quad (22)$$

Therefore, it is ease to secure $\Delta_t$ that is equal to $2 \cdot 2^{-9} \cdot S$. If $l_1=0.5$ m and C=1500 m/s, the measuring error is as follows:

$$\delta_{\Delta tl} = \frac{1.4 \times 2 \times 10^{-9} \times 1500}{0.5} \times 100 = 8.4 \times 10^{-3}\%$$

In case that $l_1=0.5$ m, it is easy to measure $l_1$ within the error of ±0.5 mm. For example, $$\delta_{l1} = \frac{0.05 \times 100}{500} = 0.01\%$$

Therefore, a measuring error $\delta_C$ of the sound velocity C is as follows:

$$\delta_C = \delta_l + \delta_{\Delta tl} = 0.01 + 8.4 \times 10^{-3} = 0.01\%$$

As a transit time $t_i$ between the paired transducers is measured using the sound velocity C, an interval distance $L_i$ between the paired transducers can be exactly measured using $L_i = C \times t_i$.

If a part of a pipe for mounting paired transducers of an ultrasonic flowmeter is made as a flange type, one side of the pipe is clogged not to leak fluid there from. The pipe is vertically put up to be fully filled with fluid, and then the sound measuring device as shown in FIG. 5 is disposed in the pipe to obtain the interval distance $L_i$ by measuring the sound velocity. Such like sound velocity measuring method is used for a sound velocity measurement regarded as a three point measuring method.

According to the invention, a flow measuring method comprises steps of measuring a flow velocity component $V_L$ of fluid corresponding to an ultrasonic transit trajectory L, which is at a certain angle to a flow velocity direction of fluid in order to measure a flow velocity V of fluid flowing through a pipe by using an ultrasonic wave, and multiplying a value of the flow velocity component by a fluid section $S_{e\perp}$, thereby to compute a flow or flowrate. Even if the direction of the flow velocity V is not identical to the centerline of the pipe, for example the flowrate is measured at a point near an elbow portion of the pipe, a larger error doesn't occur.

Figure 6A:
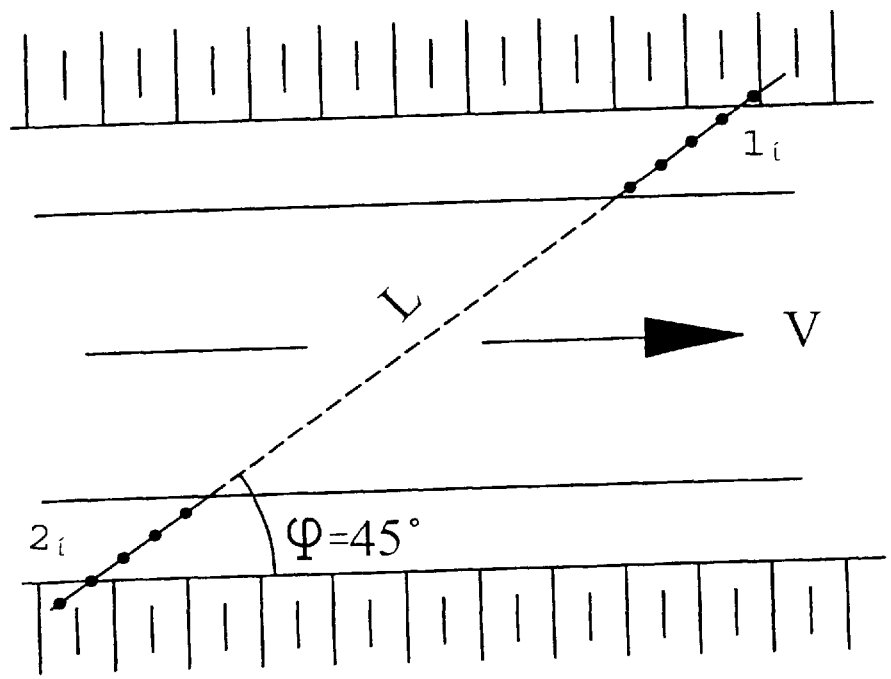
FIG. 6A is a planar view illustrating the mounting state of paired transducers for measuring a horizontal average flow velocity at a plurality of water depths.
Figure 6B:
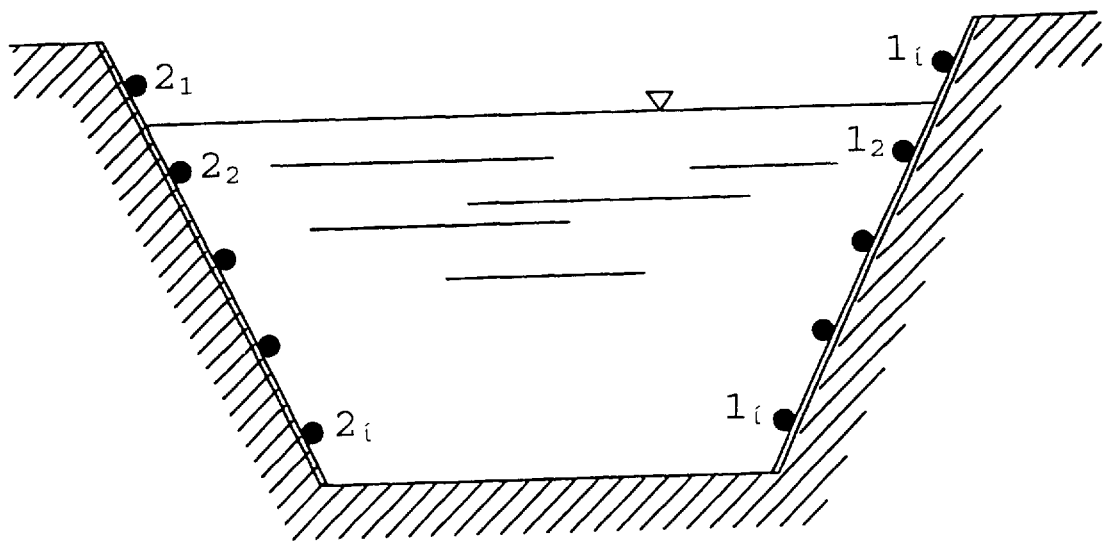
FIG. 6B is a cross-sectional view of FIG. 6A.

A flow measuring method of the invention is used in an open sluice, which is shown in FIGS. 6A and 6B. Paired transducers $1_i$ and $2_i$ are disposed at a plurality of depths on a line forming an angle $\Phi$ of 45° to the centerline of the open sluice. A section area $S\Phi$ is used as a flow measuring section, which is calculated by measuring a plurality of depths along a line of an interval distance $L_i$. Only, under the condition that the section of the open sluice is evenly distributed in an interval of d that is equal to $L\cos\Phi$, the flowrate can be very exactly measured without identifying an angle of a skew flow, even if a flow velocity of a skew flow component is developed due to a curved portion of upper or lower stream of the open sluice.

Another effect is as follows: if the paired transducers are mounted along dotted lines I and II according to a conventional method as shown in FIG. 6, the mounting angles of the paired transducers become different from each another. For it, the mounting angles of the paired transducers should be adjusted, but it is very difficult to perform the adjusting work, because the paired transducers are immersed in fluid. On the contrary, according to the invention, the paired transducers are disposed on the straight line of the interval distance L, and their arranging angles are also identical to each another. Only, the invention is requested to secure the angle $\Phi$ by adjusting a paired transducers' to supporting bar.

As described above, the invention is explained centering on a method of measuring a flow velocity $V_L$ using the transit time difference method, but the invention has the same effect in using a phase difference method.

I claim:

1. An ultrasonic flow measuring method for measuring a flow of a fluid comprising:
   selecting a section area $S\Phi$ cutting the fluid flow at an angle $\Phi$ up to 45° to a direction of the flow as a flow measuring section;
   measuring a flow velocity of the fluid for each of a plurality of chords dividing the section area $S\Phi$ using at least one ultrasonic wave to determine an average flow velocity of the fluid at the flow measuring section; and
   determining the flow of the fluid by multiplying the average flow velocity and a flow computing section area, wherein the flow computing section area is $S\Phi\tan\Phi$.

2. The ultrasonic flow measuring method as claimed in claim 1, wherein:
   the flow of the fluid is within a pipe;
   the section area $S\Phi$ is of an ellipse form; and
   measuring the flow velocity for each of the plurality of chords includes measuring flow velocities of the chords using paired transducers disposed on opposing sides of a longer diameter of the ellipse form, whereby one of the paired transducers are disposed at opposing apexes of the longer diameter.

3. The ultrasonic flow measuring method as claimed in claim 1, wherein:
   the flow of the fluid is measured within an open sluice;
   the section area $S\Phi$ is an area of the open sluice parallel to a line forming the angle $\Phi$ to a centerline of the open sluice; and
   measuring the flow velocity for each of the plurality of chords includes measuring flow velocities of the chords using paired transducers located on opposing sides of the section area $S\Phi$ at a plurality of depths along the line forming the angle $\Phi$ to the centerline.

4. The ultrasonic flow measuring method as claimed in claim 1, wherein measuring the flow velocities of the chords using paired transducers includes:
   measuring a sound velocity of the fluid;
   measuring a transit time of a sound wave between the paired transducers; and
   determining a distance L between the paired transducers based on a product of the sound velocity and the transit time.

5. The ultrasonic flow measuring method as claimed in claim 4, wherein measuring the sound velocity includes:
   measuring a first transit time of a sound wave over a first distance in the fluid;
   measuring a second transit time of a sound wave over a second distance in the fluid, the second distant being equivalent to twice the first distance; and
   wherein the sound velocity is based on a division of the first length by a difference between the second time and the first time.

6. The ultrasonic flow measuring method as claimed in claim 5, wherein:
   the flow of the fluid is measured within an open sluice; the section area $S\Phi$ is an area of the open sluice parallel to a line forming the angle $\Phi$ to a centerline of the open sluice; and
   measuring the flow velocity for each of the plurality of chords includes measuring flow velocities of the chords using paired transducers located on opposing sides of the section area $S\Phi$ at a plurality of depths along the line forming the angle $\Phi$ to the centerline.

7. The ultrasonic flow measuring method as claimed in claim 1, wherein the angle $\Phi$ is 45°.

8. An apparatus for measuring a flow of a fluid within a pipe comprising:
   a plurality of paired transducers disposed within the pipe at opposing sides of a longer diameter of an elliptical section area $S\Phi$ cutting the fluid flow at an angle $\Phi$ up to 45° to a direction of the flow;
   a mechanism for measuring a flow velocity of the fluid for each of a plurality of chords dividing the section area $S\Phi$ using at least one ultrasonic wave transmitted between the paired transducers to determine an average flow velocity of the fluid at the section area $S\Phi$; and
   a mechanism for determining the flow of the fluid based on a product of the average flow velocity of the fluid and a flow computing section area, wherein the flow computing section area is equivalent to $S\Phi\tan\Phi$.

9. The apparatus of claim 7, wherein the angle $\Phi$ is 45°.

10. An apparatus for measuring a flow of a fluid within an open sluice comprising:
    a plurality of paired transducers disposed at a plurality of depths on opposing sides of a section area $S\Phi$ of the open sluice parallel to a line forming an angle $\Phi$ up to 45° to a centerline of the open sluice;
    means for measuring a flow velocity of the fluid for each of a plurality of chords dividing the section area $S\Phi$ using at least one ultrasonic wave transmitted between the paired transducers to determine an average flow velocity of the fluid at the section area $S\Phi$; and
    means for determining the flow of the fluid based on a product of the average flow velocity of the fluid and a flow computing section area, wherein the flow computing section area is equivalent to $S\Phi\tan\Phi$.

11. The apparatus of claim 9, wherein the angle $\Phi$ is 45°.

* * * * *